United States Patent
Wang et al.

(10) Patent No.: US 10,915,963 B2
(45) Date of Patent: Feb. 9, 2021

(54) INVESTMENT STRATEGY RULE GENERATION METHOD AND AN INVESTMENT STRATEGY RULE DEVICE USING THE SAME

(71) Applicant: INDUSTRIAL TECHNOLOGY RESEARCH INSTITUTE, Hsinchu (TW)

(72) Inventors: En-Tzu Wang, Kaohsiung (TW); Chi-Yuan Yeh, Hsinchu (TW); Sian-Hong Huang, Kaohsiung (TW); Ming-Yao Tsai, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 161 days.

(21) Appl. No.: 16/234,390

(22) Filed: Dec. 27, 2018

(65) Prior Publication Data
US 2020/0143477 A1 May 7, 2020

(30) Foreign Application Priority Data
Nov. 6, 2018 (TW) .............................. 107139341 A

(51) Int. Cl.
*G06Q 40/06* (2012.01)
*G06Q 30/02* (2012.01)
*G06F 30/20* (2020.01)

(52) U.S. Cl.
CPC ............. *G06Q 40/06* (2013.01); *G06F 30/20* (2020.01); *G06Q 30/0202* (2013.01); *G07C 2209/08* (2013.01)

(58) Field of Classification Search
CPC .... G06Q 40/06; G06Q 30/0202; G06Q 10/04; G06F 30/20; G07C 2209/08
See application file for complete search history.

(56) References Cited

U.S. PATENT DOCUMENTS

| 5,761,442 | A | 6/1998 | Barr et al. |
| 6,564,190 | B1 * | 5/2003 | Dubner ................ G06Q 40/06 705/36 R |

(Continued)

FOREIGN PATENT DOCUMENTS

| CN | 106503870 A | 3/2017 |
| TW | I326053 B | 6/2010 |
| WO | WO-03034180 A2 * | 4/2003 ............. G06Q 40/06 |

OTHER PUBLICATIONS

Sharipova et al.: Computer-Aided Estimation of Portfolio Management Quality, 2016, IEEE Xplore, pp. 184-188 (Year: 2016).*

(Continued)

*Primary Examiner* — Bijendra K Shrestha
(74) *Attorney, Agent, or Firm* — Birch, Stewart, Kolasch & Birch, LLP

(57) ABSTRACT

An investment strategy rule generation method including the following steps is provided. Firstly, an investment strategy rule generator generates an investment strategy model according to an investment history trend. Then, a total investment return of each of N candidate investment rules is obtained by the investment strategy rule calculator, wherein each of the N candidate investment rules includes a candidate market direction rule. The obtaining step includes: performing an investment simulation in each of multiple time points in a time window of a time interval. Then, the total investment return under the operation of the investment simulations over the time interval is calculated by the investment strategy rule calculator. Then, the candidate investment rule corresponding to the best of the total investment returns is used as an investment strategy rule of the investment strategy model by the investment strategy rule calculator.

11 Claims, 4 Drawing Sheets

(56) References Cited

U.S. PATENT DOCUMENTS

| | | | |
|---|---|---|---|
| 7,177,831 B1 | 2/2007 | O'Shaughnessy et al. | |
| 7,373,324 B1* | 5/2008 | Engin | G06Q 40/00 705/35 |
| 2003/0093353 A1* | 5/2003 | Ward | G06Q 40/02 705/36 R |
| 2008/0208767 A1* | 8/2008 | Murray | G06Q 40/06 705/36 R |
| 2010/0169237 A1* | 7/2010 | Howard | G06Q 40/06 705/36 R |
| 2011/0153520 A1* | 6/2011 | Jeng | G06O 40/06 705/36 R |
| 2011/0208671 A1* | 8/2011 | Edwards | G06Q 40/06 705/36 R |
| 2013/0041841 A1* | 2/2013 | Lyons | G06Q 50/16 705/36 R |
| 2013/0290216 A1* | 10/2013 | Scheffler | G06Q 40/06 705/36 R |
| 2017/0004579 A1 | 1/2017 | Chau | |
| 2017/0132537 A1* | 5/2017 | Chavez | G06Q 10/04 |

OTHER PUBLICATIONS

Qiu et al.: Predicting the Direction of Stock Market Index Movement Using an Optimized Artificial Neural Network Model, May 19, 2016, pp. 108 (Year: 2016).*

Vasconcelos, Gabriel: Formal ways to compare forecasting models: Rolling windows, Nov. 9, 2017, Insight R Blog, (Year: 2017).*

Blume, et al., "Evolution and Market Behavior", Journal of Economic Theory, vol. 58, 1992, pp. 9-40.

Bottazzi, et al., "Far from the Madding Crowd: Collective Wisdom in Prediction Markets", LEM Working Paper Series, Apr. 2016, pp. 1-27, 29 total pages.

Chou, et al., "Making Profit in a Prediction Market", COCOON 2012: Computing and Combinatorics, 7 total pages.

Hin, et al., "Asset allocation: International real estate investment strategy under a workable analytic hierarchy process (AHP)", Journal of Property Investment & Finance, vol. 24, Issue: 4, 4 total pages.

Kelly, Jr., "A New Interpretation of Information Rate", The Bell Technical Journal, Jul. 1956, pp. 917-926.

Kvietkauskienė, et al., "Performance Evaluation of Stock Markets", 5th International Scientific Conference, Contemporary Issues in Business, Management and Education'2017, pp. 136-147.

Mani, et al., "An analysis of neural-network forecasts from a large-scale, real-world stock selection system", IEEE, 1995, pp. 72-78.

Sciubba, "The Evolution of Portfolio Rules and the Capital Asset Pricing Model", Cambridge Working Papers in Economics 9909, Faculty of Economics, University of Cambridge, Jul. 1998, pp. 1-48.

* cited by examiner

INVESTMENT STRATEGY RULE GENERATION METHOD AND AN INVESTMENT STRATEGY RULE DEVICE USING THE SAME

This application claims the benefit of Taiwan application Serial No. 107139341, filed Nov. 6, 2018, the disclosure of which is incorporated by reference herein in its entirety.

TECHNICAL FIELD

The disclosure relates in general to an investment strategy rule generation method and an investment strategy rule device using the same.

BACKGROUND

Most of the current investment forecasting methods derive an investment model from past market trend through machine learning. Then, the investment model is further used to generate a future forecasting trend. However, the accuracy of the future forecasting trend cannot reach 100%. To the worse, the accuracy may even be far below 100% and arise investment risk. In the investment market, investors normally set fixed proportions among a number of investment targets. For example, 20% of the capital is allocated to fund A, and 80% of the capital is allocated to fund B. When the market index of the investment market changes, the financial robot will normally adjust the amount of the capital invested in fund A and fund B but will maintain the proportions of investment between fund A and fund B unchanged, that is, fund A and fund B will occupy 20% and 80% of the capital respectively. However, such asset allocation is not based on the future forecasting of the investment market.

Therefore, how to provide a new investment forecasting model capable of resolving the above mentioned problems has become a prominent task for the industries.

SUMMARY

According to one embodiment, an investment strategy rule generation method is provided. The investment strategy rule generation method includes the following steps. An investment strategy model is generated by an investment strategy rule generator according to a history trend of an investment market, wherein the investment strategy model has a market direction forecasting accuracy lower than 100%; a total investment return of each of N candidate investment rules is obtained by an investment strategy rule calculator, wherein each of the N candidate investment rules includes a candidate market direction rule. The obtaining step includes: performing an investment simulation at each of multiple time points in a time window of a time interval. The investment simulation includes: generating a market direction forecasting rule according to the market direction forecasting accuracy; and performing a market entry investment model or a holding investment model according to the market direction forecasting rule and the candidate market direction rule of the i-th of the N candidate investment rules. The total investment return under the operation of the market entry investment models and the holding investment models is calculated by the investment strategy rule calculator over the time interval. The candidate investment rule corresponding to the best of the total investment returns is used as an investment strategy rule of the investment strategy model by the investment strategy rule calculator.

According to another embodiment, an investment strategy rule generation method is provided. The investment strategy rule generation method includes the following steps. An investment strategy model is generated by an investment strategy rule generator according to a history trend of an investment market, wherein the investment strategy model has a market direction forecasting accuracy lower than 100%. A total investment return of each of N candidate investment rules is obtained by an investment strategy rule calculator, wherein each of the N candidate investment rules includes a candidate market entry direction rule and a candidate holding direction rule. The obtaining step includes: performing an investment simulation at each of multiple time points in a time window of a time interval. The investment simulation includes: generating a market entry direction forecasting rule according to the market direction forecasting accuracy; generating a holding direction forecasting rule according to the market direction forecasting accuracy; and determining whether a current investment model is in a holding state. If it is determined that the current investment model is not in the holding state, whether the market entry direction forecasting rule matches the candidate market entry direction rule of the i-th of the N candidate investment rules is determined, wherein i is a positive integer between 1 to N; and if it is determined that the market entry direction forecasting rule matches the candidate market entry direction rule of the i-th of the N candidate investment rules, a market entry investment model is performed. If it is determined that the current investment model is in the holding state, whether the holding direction forecasting rule matches the candidate holding direction rule of the i-th of the N candidate investment rules is determined; and if it is determined that the holding direction forecasting rule matches the candidate holding direction rule of the i-th of the N candidate investment rules, a holding investment model is performed. A total investment return under the operation of the market entry investment models and the holding investment models is calculated by the investment strategy rule calculator over the time interval. The candidate investment rule corresponding to the best of the total investment returns is used as an investment strategy rule of the investment strategy model by the investment strategy rule calculator.

According to an alternate embodiment, an investment strategy rule device is provided. The investment strategy rule device includes an investment strategy rule generator and an investment strategy rule calculator. The investment strategy rule generator is configured to generate an investment strategy model according to a history trend of an investment market, wherein the investment strategy model has a market direction forecasting accuracy lower than 100%. The investment strategy rule calculator is configured to obtain a total investment return of each of N candidate investment rules, wherein N is a positive integer equivalent to or larger than 2, each of the N candidate investment rules comprises a candidate market entry direction rule and a candidate holding direction rule. The obtaining step comprises: performing an investment simulation at each of multiple time points in a time window of a time interval. The investment simulation includes: generating a market entry direction forecasting rule according to the market direction forecasting accuracy; generating a holding direction forecasting rule according to the market direction forecasting accuracy; and determining whether a current investment model is in a holding state. If it is determined that the current investment model is not in the holding state, whether the market entry direction forecasting rule matches the candidate market entry direction rule of the i-th of the N candidate investment rules is determined, wherein i is a positive integer between 1 to N; and if it is determined that the market entry direction forecasting rule matches the candidate market entry direction rule of the i-th of the N candidate investment rules, a market entry investment model is performed. If it is determined that the current investment model is in the holding state, whether the holding direction forecasting rule matches the candidate holding direction rule of the i-th of the N candidate investment rules is determined; and if it is determined that the holding direction forecasting rule matches the candidate holding direction rule of the i-th of the N candidate investment rules, a holding investment model is performed. The investment strategy rule calculator is further configured to calculate a total investment return under the operation of the market entry investment models and the holding investment models over the time interval; and use the candidate investment rule corresponding to the best of the total investment returns as an investment strategy rule of the investment strategy model.

The above and other aspects of this disclosure will become better understood with regard to the following detailed description of the preferred but non-limiting embodiments. The following description is made with reference to the accompanying drawings.

Figure 1:
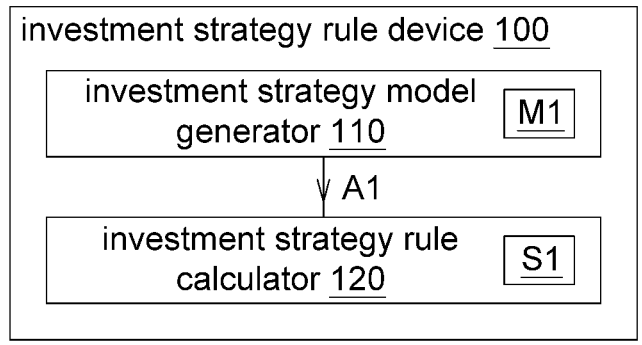
FIG. 1 is a functional block diagram of an investment strategy rule device according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2:
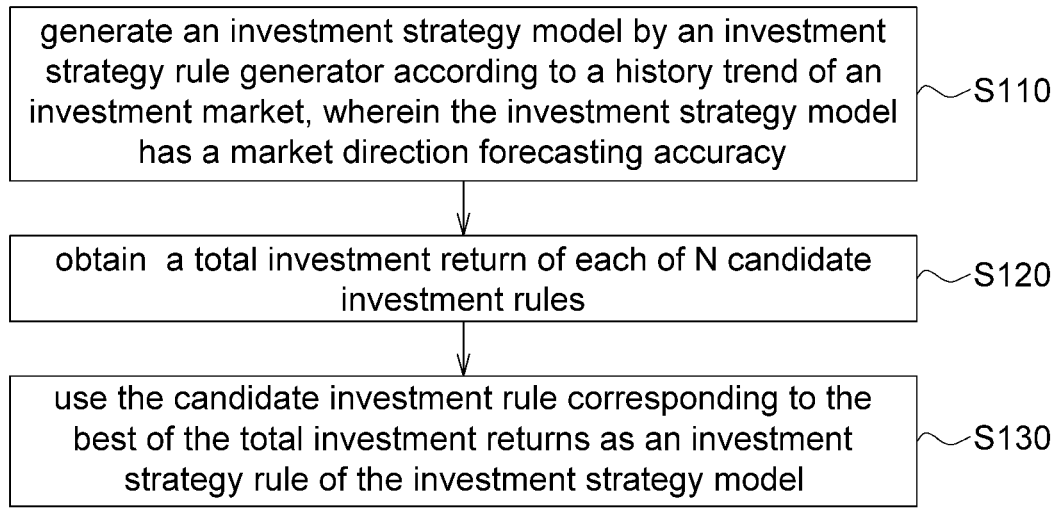
FIG. 2 is a flowchart of an investment strategy rule generation method according to an embodiment of the present disclosure.

Refer to FIGS. 1 and 2. FIG. 1 is a functional block diagram of an investment strategy rule device according to an embodiment of the present disclosure. FIG. 2 is a flowchart of an investment strategy rule generation method according to an embodiment of the present disclosure.

As indicated in FIG. 1, the investment strategy rule device 100 includes an investment strategy rule generator 110 and an investment strategy rule calculator 120. The investment strategy rule generator 110 and/or the investment strategy rule calculator 120 could be realized by firmware, software, or circuit structures formed using manufacturing process of semiconductor. The investment strategy rule generator 110 and/or the investment strategy rule calculator 120 could be integrated as one single component or integrated in a processor, such as a central processing unit (CPU), but the embodiment of the present disclosure is not limited thereto.

Procedures of the investment strategy rule device 100 performing an investment strategy rule generation method are described below with accompanying drawings FIGS. 2 to 3. FIG. 1 is a functional block diagram of an investment strategy rule device 100 according to an embodiment of the present disclosure. FIG. 2 is a flowchart of an investment strategy rule generation method according to an embodiment of the present disclosure. The procedures of the investment strategy rule device 100 performing an investment simulation in other time window are similar or identical to the procedures illustrated in FIG. 3.

In step S110, an investment strategy model M1 is generated by the investment strategy rule generator 110 according to a history trend of an investment market. The investment market could be a stock market, a bond market, a fund market or an investment market of other types. In the embodiment of the present disclosure, the investment market is exemplified by the bond market.

Figure 4:
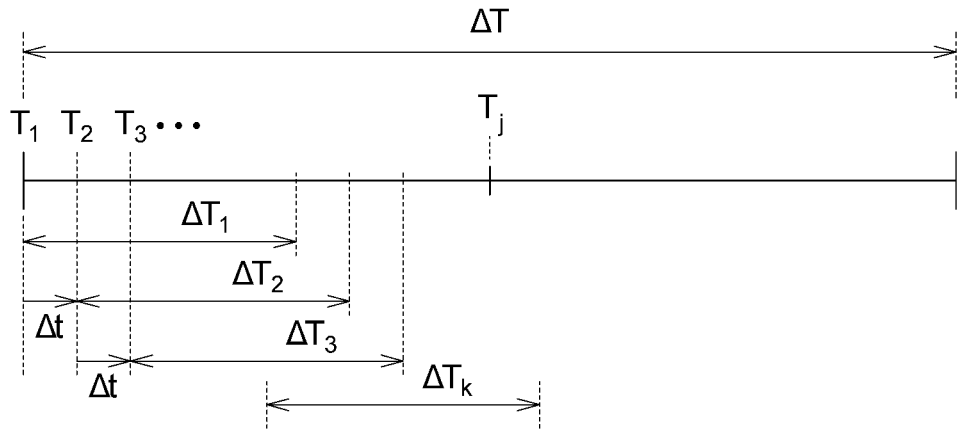
FIG. 4 is a schematic diagram of a time interval of a history trend according to an embodiment of the present disclosure.

FIG. 4 is a schematic diagram of a time period ΔT of a history trend according to an embodiment of the present disclosure. As indicated in FIG. 4, the history trend, such as the market index or any other investment data, is the data of history trend based on a past time period ΔT of the investment market. The length of the "time period ΔT" could be 20 years or could be shorter or longer than 20 years.

Besides, the investment strategy rule generator 110 could generate an investment strategy model M1 using a deep neural network (DNN) technology, a support vector machine (SVM) technology or other AI technology. In an embodiment, the investment strategy rule generator 110 could generate an investment strategy model M1 according to the history trend of the investment market over a front segment of the time period ΔT. Then, the accuracy of the investment strategy model M1, such as the market direction forecasting accuracy A1, is tested according to the history trend of the investment market over a rear segment of the time period ΔT. The "front segment" is, for example, ¾ of the time period ΔT, and the "rear segment" is, for example, ¼ of the time period ΔT, but the embodiment of the present disclosure is not limited thereto.

Although the market direction forecasting accuracy A1 of the investment strategy model M1 is lower than 100%, the investment strategy model M1 is valid as long as the market direction forecasting accuracy A1 is equivalent to or larger than 50%. Also, an investment strategy rule S1 could be obtained from step S120 to compensate the inadequacy of the investment strategy model M1 having an accuracy lower than 100%.

In step S120, a total investment return of the i-th (represented by Ri) of multiple candidate investment rules R is obtained by the investment strategy rule calculator, wherein i is a positive integer between 1 to N, and N is a positive integer larger than 1. In the embodiment of the present disclosure, the upper limit of N is not limited. Besides, the total investment return could be the investment index or any other investment reference obtained in the investment simulation over the time period ΔT for determining whether the investment target is worthy of investment. Examples of the total investment return include the ratio by which the holding price is lower than the trading price, the annual return on investment, the standard error of annual return on investment, the interval total return, the improvement rate by which the annual return on investment is higher than the return on investment of holding the investment target for three years. In the present specification, the investment target refers to any investment products issued in the investment market, such as stock, fund and bond.

Each candidate investment rule Ri includes a candidate market entry direction rule E and a candidate holding direction rule F.

The operation of the candidate market entry direction rule E is disclosed below.

The candidate market entry direction rule E could be represented as (Ex, Ey, Ez). Parameter Ex indicates whether the trend of the first future time period is "advancing" or "declining", wherein "advancing" is represented by 1, "declining" is represented by 0, and the "first future time period" could be the next month. Parameter Ey indicates whether the trend of the second future time period is "advancing" or "declining", wherein "advancing" is represented by 1, "declining" is represented by 0, and the "second future time period" could be the next three months. parameter Ey indicates whether the trend of the third future time period is "advancing" or "declining", wherein "advancing" is represented by 1, "declining" is represented by 0, and the "third future time period" could be the next six months. For example, when the trends of the next month, the next three months and the next six months respectively are "advancing", "declining" and "declining", the candidate market entry direction rule E could be represented as (1, 0, 0). Moreover, in the candidate market entry direction rule E, the "first future time period", the "second future time period" and the "third future time period" are defined with respect to the same time point. Additionally, in the embodiment of the present disclosure, the time lengths of the "first future time period", the "second future time period" and the "third future time period" are not limited to the next month, the next three months and the next six months as exemplified above, and could also be other time lengths.

Based on the above principles, the candidate market entry direction rule E has $2^3$ combinations in total, but the number of combinations is reduced to $(2^3-1)$ after the combination (0,0,0) is excluded.

The operation of the candidate holding direction rule F is disclosed below.

The candidate holding direction rule F could be represented as (Fx, Fy, Fz). Parameter Fx indicates whether the trend of the first future time period is "advancing" or "declining", wherein "advancing" is represented by 1, "declining" is represented by 0, and the first future time period could be the next month. Parameter Fy indicates whether the trend of the second future time period is "advancing" or "declining", wherein "advancing" is represented by 1, "declining" is represented by 0, and the second future time period could be the next three months. Parameter Fy indicates whether the trend of the third future time period is "advancing" or "declining", wherein "advancing" is represented by 1, "declining" is represented by 0, and the third future time period could be the next six months. For example, when the trends of the next month, the next three months and the next six months respectively are "declining", "advancing" and "declining", the candidate holding direction rule F could be represented as (0, 1, 0). Besides, in the candidate holding direction rule F, the "first future time period", the "second future time period" and the "third future time period" are defined with respect to the same time point. Moreover, in the embodiment of the present disclosure, the time lengths of the "first future time period", the "second future time period" and the "third future time period" are not limited to the next month, the next three months and the next six months as exemplified above, and could also be other time lengths.

Based on the above principles, the candidate holding direction rule F has $2^3$ combinations in total, but the number of combinations is reduced to $(2^3-1)$ after the combination (0,0,0) is excluded.

Once all combinations of the candidate market entry direction rule E and the candidate holding direction rule F are determined, the combinations of the candidate investment rule R could then be determined. In the present embodiment, the candidate investment rule R is a combination of all candidate market entry direction rules E and all candidate holding direction rules F. For example, the candidate investment rule R has $(2^3-1)\times(2^3-1)$ combinations, that is, the value of N is defined as $(2^3-1)\times(2^3-1)$.

Figure 3:
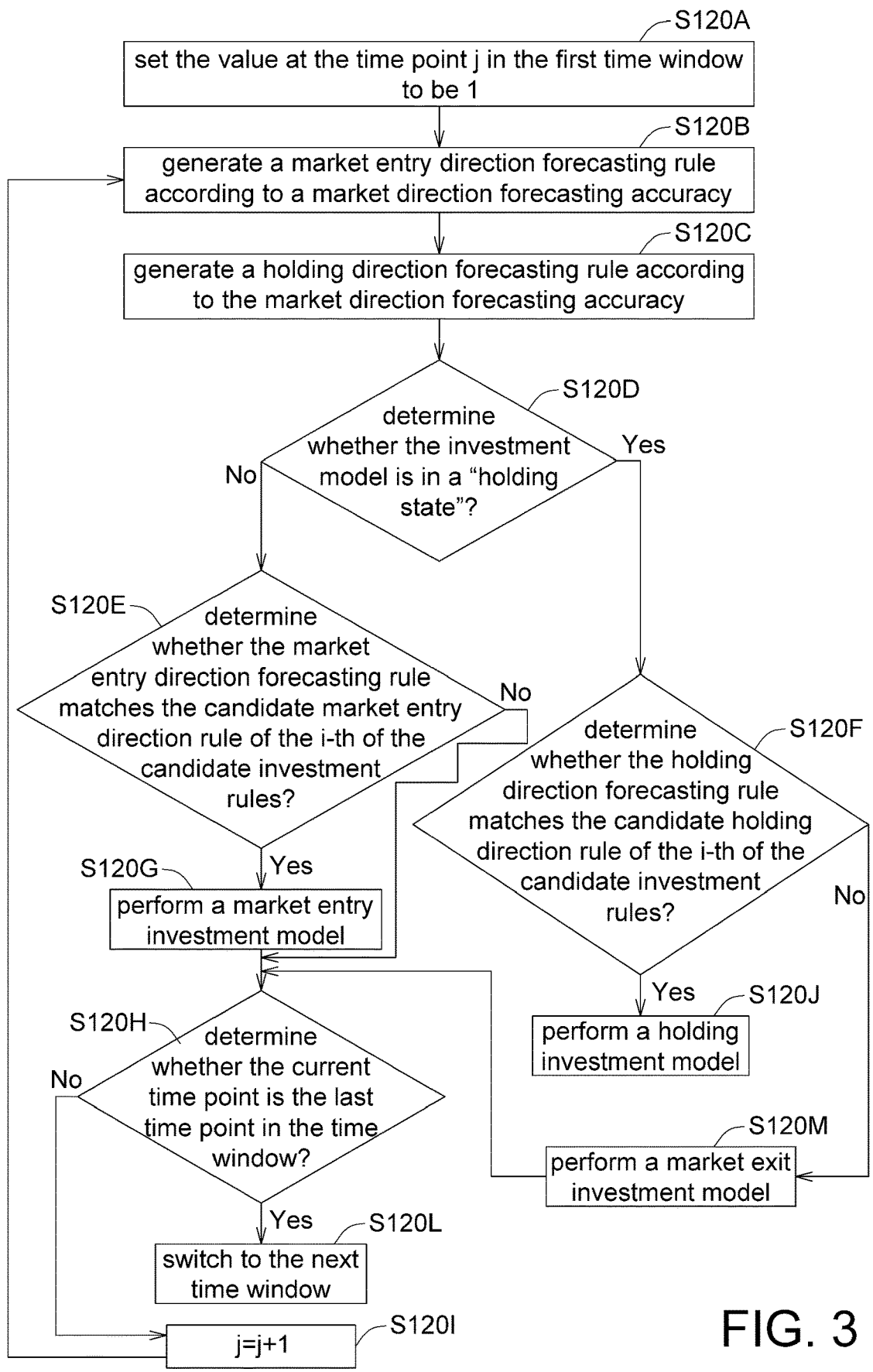
FIG. 3 is a flowchart of the investment strategy rule device of FIG. 1 performing an investment simulation in a time window.

The total investment return of the step S120 could be obtained using multiple methods, and one of the methods is explained with FIG. 3.

At each of the multiple time points in a time window of the time period $\Delta T$, the investment strategy rule calculator 120 further the following sub-steps S120A to S120M. To put it in greater details, the "multiple time points" could be exemplified by multiple time points in the k-th time window of the time period $\Delta T$ of FIG. 4. The length of the time window could be three years, or could be shorter or longer than three years. As indicated in FIG. 4, two adjacent time windows are separated by a time interval $\Delta t$, and the number of time windows depends on the value of the time interval $\Delta t$. In an embodiment, the time interval $\Delta t$ could be a month, or could be longer or shorter than a month. In the embodiment of the present disclosure, the number of time windows is not limited, and the number could be any positive integer including one, two, tens, hundreds or above. Additionally, in the embodiment of the present disclosure, the number of time points in a time window is not limited, and the number could be any positive integer including one, two, tens, hundreds or above.

The investment simulation of the first candidate investment rule $R_1$ (that is, i=1) of the multiple candidate investment rules R based on multiple time points (such as time points $T_1, T_2, T_3 \ldots T_j \ldots$) in the first time window $\Delta T_1$ (that is, k=1) is exemplified below.

In step S120A, the value at the time point j in the first time window $\Delta T_1$ is set to be 1 by the investment strategy rule calculator 120, that is, investment simulation begins at the first time point $T_1$ in the first time window $\Delta T_1$.

In step S120B, at the first time point $T_1$ in the first time window $\Delta T_1$, a market entry direction forecasting rule PE1 is generated by the investment strategy rule calculator 120 according to the market direction forecasting accuracy A1. Like the candidate market entry direction rule E, the market entry direction forecasting rule PE1 could be represented by (PE1x, PE1y, PE1z), wherein the representations of the parameters PE1x, PE1y and PE1z are respectively identical or similar to that of the parameters Ex, Ey and Ez disclosed above. For example, when the market direction forecasting accuracy A1 is 70% (the embodiment of the present disclosure is not limited thereto), this indicates that the probability of generating a correct market direction is 70%, and the investment strategy rule calculator 120 randomly generates the values of parameters PE1x, PE1y and PE1z being 1 or 0 according to a probability of 70%. For example, the values of parameters PE1x, PE1y and PE1z are (1, 0, 0). However, (1, 0, 0) is an exemplification only, and is not for limiting the embodiment of the present disclosure.

In step S120C, at the first time point $T_1$ in the first time window $\Delta T_1$, a holding direction forecasting rule PF1 is generated by the investment strategy rule calculator 120 according to the market direction forecasting accuracy A1. Like the candidate holding direction rule F, the holding direction forecasting rule PF1 could be represented by (PF1$x$, PF1$y$, PF1$z$), wherein the representations of the parameters PF1$x$, PF1$y$ and PF1$z$ are respectively identical or similar to that of the parameters Fx, Fy and Fz disclosed above. For example, when the market direction forecasting accuracy A1 is 70% (the embodiment of the present disclosure is not limited thereto), the investment strategy rule calculator 120 randomly generates the values of parameters PE1$x$, PE1$y$ and PE1$z$ being 1 or 0 according to a probability of 70%. For example, the values of parameters PF1$x$, PF1$y$ and PF1$z$ are (0, 1, 0). However, (0, 1, 0) is an exemplification only, and is not for limiting the embodiment of the present disclosure.

In step S120D, whether the investment model is in a "holding state" at the current time point (that is, the time point j) is determined by the investment strategy rule calculator 120. If so, then the method proceeds to the step S120F; otherwise, then the method proceeds to the step S120E. To put it in greater details, if only the market entry investment model but not the market exit investment model is performed in the investment simulation in the first time window $\Delta T_1$, then the investment model is in the "holding state", and the method proceeds to the step S120F. In the present example, the investment model at the first time point $T_1$ in the first time window $\Delta T_1$ is unlikely to be in the "holding state", so the method proceeds to step S120E. However, the above exemplification is not for limiting the embodiment of the present disclosure.

In step S120E, whether the market entry direction forecasting rule PE1 matches the candidate market entry direction rule E of the first candidate investment rule $R_1$ is determined by the investment strategy rule calculator 120. If it is determined that the two rules match, then the method proceeds to the step S120G, a market entry investment model is performed by the investment strategy rule calculator 120. If it is determined that the two rules do not match, then the method proceeds to the step S120M. Let the candidate market entry direction rule of the first candidate investment rule $R_1$ be (1, 0, 0). If the market entry direction forecasting rule also is (1, 0, 0), this indicates that the two rules match, then the method proceeds to the step S120G. If the market entry direction forecasting rule is (0, 1, 0), this indicates that the two rules do not match, and the method proceeds to the step S120H.

Moreover, in the embodiment of the present disclosure, the "market entry investment model" could be set as: if the investment strategy rule calculator 120 could buy at least one investment target in the investment market, then the investment strategy rule calculator 120 will not buy any investment target with high risk, wherein the at least one investment target has top performance in the investment market (such as the top 10 or others) and/or matches the investor's orientation, for example, the investor has a conservative orientation. However, in the embodiment of the present disclosure, the operation of the "market entry investment model" is not limited thereto, and each time when the "market entry investment model" is performed, the operation could be consistent or totally different. As for the total investment amount and/or the proportion of each investment target in the "market entry investment model", these values could be determined according to the values pre-set by the investor, and are not limited in the embodiment of the present disclosure.

In step S120H, whether the time point $T_1$ is the last time point in the first time window $\Delta T_1$ is determined by the investment strategy rule calculator 120. If it is determined that the time point $T_1$ is not the last time point, then the method proceeds to the step S120I, the value of j is accumulated (that is, j=j+1), and then the method returns to the step S120B, the investment simulation at the next time point in the first time window $\Delta T_1$ is performed. If it is determined that the time point $T_1$ is the last time point, then the method proceeds to S120L, the value of k is accumulated (that is, k=k+1) to switch to next time window, for example, the second time window $\Delta T_2$, and the operation of investment simulation of FIG. 3 is repeated.

In step S120F, if it is determined that the investment model is in the "holding state", whether the holding direction forecasting rule PF1 matches the candidate holding direction rule F of the first candidate investment rule $R_1$ is determined by the investment strategy rule calculator 120. If it is determined that the two rules match, then the method proceeds to the step S120J, a holding investment model is performed by the investment strategy rule calculator 120, that is, the investment model recommends to continue to hold any investment target in the investment market. If it is determined that the two rules do not match, then the method proceeds to the step S120M. Let the candidate holding direction rule of the first candidate investment rule $R_1$ be (0, 1, 0). If the holding direction forecasting rule also is (0, 1, 0), this indicates that the two rules match, then the method proceeds to the step S120J. If the holding direction forecasting rule is (1, 1, 0), this indicates that the two rules do not match, and the method proceeds to the step S120M.

In step S120M, since the holding direction forecasting rule PF1 does not match the candidate holding direction rule F, this indicates that the investment model does not recommend to continue to hold the investment target, and a market exit investment model is performed by the investment strategy rule calculator 120. For example, all investment targets in the investment market are sold. Then, the method proceeds to the step S120H. Details of step S120H are already disclosed above, and the similarities are not repeated here.

The above descriptions relate to the investment simulation performed at all time points in the first time window according to the first candidate investment rule. The investment strategy rule calculator 120 obtains a short-term investment return corresponding to the first time window $\Delta T1$ after repeatedly performing different investment models including market entry, holding, and market exit investment model in the first time window $\Delta T1$ according to the first candidate investment rule $R_1$ and further comparing the result of investment simulation with actual history trend. The investment strategy rule calculator 120 stores the short-term investment return corresponding to the first time window $\Delta T1$. Then, the investment strategy rule calculator 120 switches to the next time window (that is, k=k+1). For example, after the investment simulation in the first time window $\Delta T1$ is completed, the investment strategy rule calculator 120 switches to the second time window $\Delta T2$ and repeats steps S120A to S120M to obtain a short-term investment return corresponding to the second time window $\Delta T2$.

Based on the above principle, the investment simulation is performed in all time windows.

Suppose the entire time period $\Delta T$ has M time windows. After the investment strategy rule calculator 120 has completed the investment simulation in the M time windows, the investment strategy rule calculator 120 will obtain M short-term investment returns. The investment strategy rule calculator 120 could calculate the M short-term investment returns to obtain an average value, and could further use the average value as the total investment return of the first candidate investment rule R1 over the time period ΔT.

After obtaining the total investment return of the first candidate investment rule R1 over the time period ΔT, the investment strategy rule calculator 120 could obtain the total investment return of each candidate investment rule Ri by performing the same operation. After completing the investment simulation of all candidate investment rules R, the investment strategy rule calculator 120 will obtain N total investment returns with respect to the N candidate investment rules R.

Then, the method proceeds to step S130 of FIG. 2, the candidate investment rule corresponding to the best of the total investment returns R is used as the investment strategy rule of the investment strategy model M1 by the investment strategy rule calculator 120. Let the total investment return be the annual return on investment. If the candidate market entry direction rule corresponding to the best of the total investment returns is E represented by [(1, 0, 1), (1,1,1), (1, 1, 0)], and the candidate holding direction rule F is represented by [(0, 1, 0), (0,0,1)], then the investment strategy rule calculator 120 uses the candidate market entry direction rule E=[(1, 0, 1), (1,1,1), (1, 1, 0)] as the market entry direction strategy SE1 of the investment strategy rule S1 and uses the candidate holding direction rule F=[(0, 1, 0), (0,0,1)] as the holding direction strategy SF1 of the investment strategy rule S1, wherein the market entry direction strategy SE1 is represented by [(0, 1, 0), (0,0,1)] and the holding direction strategy SF1 is represented by [(0, 1, 0), (0,0,1)].

After the investment strategy rule S1 is obtained, the investment strategy rule S1 could be used as the investor's reference in the real investment market. Details of the flowchart of an investment strategy evaluation method according to an embodiment of the present disclosure are disclosed below.

Figure 5:
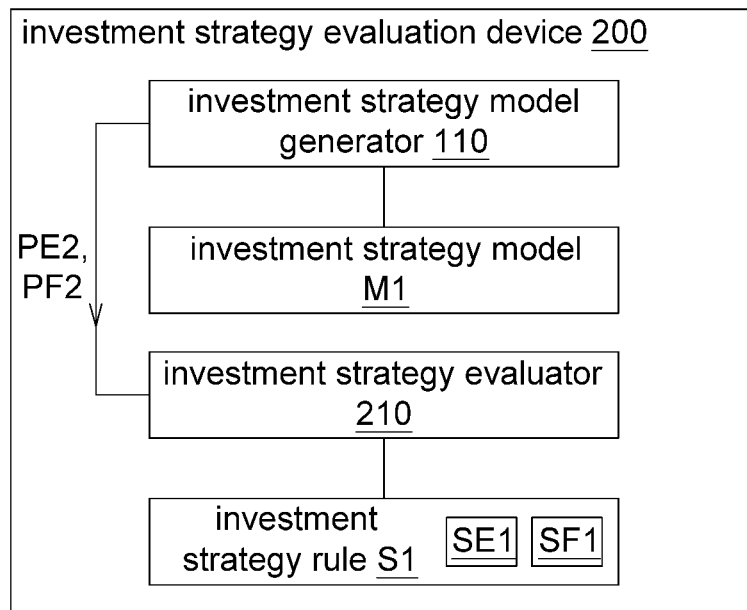
FIG. 5 is a functional block diagram of an investment strategy evaluation device according to an embodiment of the present disclosure.
Figure 6:
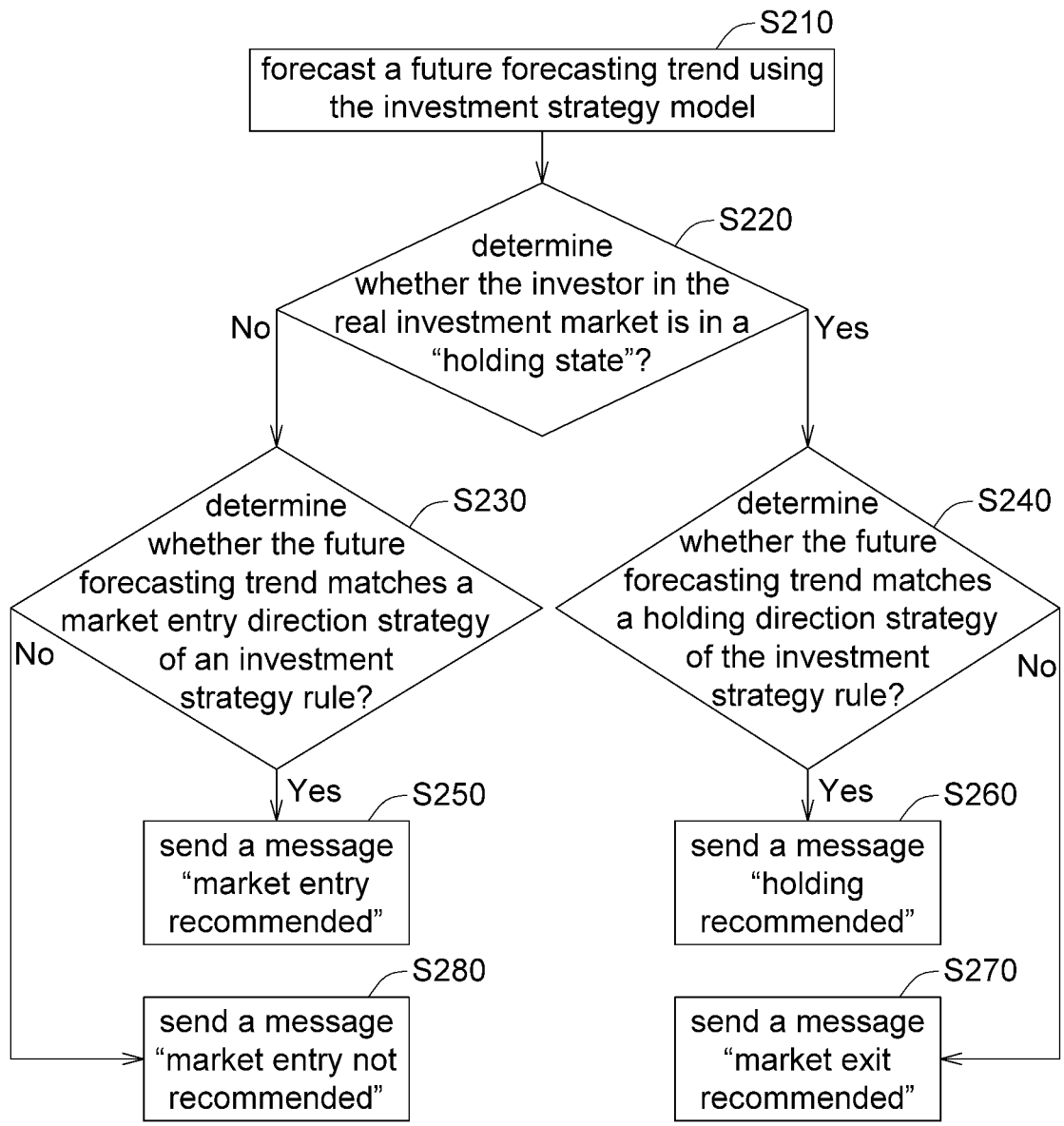
FIG. 6 is a flowchart of an investment strategy evaluation method according to an embodiment of the present disclosure.

Refer to FIGS. 5 and 6. FIG. 5 is a functional block diagram of an investment strategy evaluation device 200 according to an embodiment of the present disclosure. FIG. 6 is a flowchart of an investment strategy evaluation method according to an embodiment of the present disclosure.

As indicated in FIG. 5, the investment strategy evaluation device 200 includes an investment strategy rule generator 110, an investment strategy evaluator 210, an investment strategy model M1 and an investment strategy rule S1. The investment strategy rule generator 110 and the investment strategy evaluator 210 could be realized by circuit structures formed using the manufacturing process of semiconductor. The investment strategy rule generator 110 and/or the investment strategy evaluator 210 could be integrated as one single component or integrated in a processor, such as a central processing unit.

The investment strategy evaluation device 200 could generate an investment advice (such as market entry, holding or market exit) by using the investment strategy rule S1 according to the current data (such as the updated or the same day data) of the investment market. Detailed descriptions of the flowchart of an investment strategy evaluation method according to an embodiment of the present disclosure are disclosed below with FIG. 6.

In step S210, a future forecasting trend S2 is forecasted by the investment strategy rule generator 110 using the investment strategy model M1. The future forecasting trend S2 is referred with respect to the current time point. The future forecasting trend S2 includes a market entry direction forecasting strategy PE2 and a holding direction forecasting strategy PF2. Like the candidate market entry direction rule E disclosed above, the market entry direction forecasting strategy PE2 also could be represented as (PE2$x$, PE2$y$, PE2$z$), wherein the representations of the parameters PE2$x$, PE2$y$ and PE2$z$ are respectively identical or similar to that of the parameters PE1$x$, PE1$y$ and PE1$z$, and the similarities are not repeated here. Like the candidate holding direction rule F disclosed above, the holding direction forecasting strategy PF2 could be represented as (PF2$x$, PF2$y$, PF2$z$), wherein the representations of the parameters PF2$x$, PF2$y$ and PF2$z$ are respectively identical or similar to that of the parameters PF1$x$, PF1$y$ and PF1$z$, and the similarities are not repeated here.

In step S220, whether the investor in the real investment market is in a "holding state" is determined by the investment strategy evaluator 210. Furthermore, the investment strategy evaluator 210 could determine whether the investor has real investment in the investment market according to the investment data inputted by the investor beforehand (such as the investment target and/or the capital currently invested in the investment market). If the investor holds any investment target in the investment market, whether the investor's investment situation is in the "holding state" is determined. If the investor does not hold any investment target in the investment market, whether the investor's investment situation is in "non-holding state" is determined. The scenario "not holding any investment target" indicates that the investment strategy evaluator 210 searches the investment data but does not find any investment target in the investment market (for example, the investor once held an investment target but now has exited the market) or the investment data shows a message "not holding". This scenario "not holding any investment target" normally occurs when the investor once held the investment target but has now exited the market, or the investment strategy evaluator 210 performs the first evaluation.

If the investor in the investment market is not in the "holding state", then the method proceeds to the step S230. If the investor in the investment market is in the "holding state", then the method proceeds to the step S240.

In step S230, whether the market entry direction forecasting strategy PE2 of the future forecasting trend S2 matches the market entry direction strategy SE1 of the investment strategy rule S1 is determined by the investment strategy evaluator 210. If it is determined that the two strategies match, then the method proceeds to the step S250, a message "market entry recommended" is sent by the investment strategy evaluator 210. If it is determined that the two strategies do not match, then the method proceeds to the step S280, a message "market entry not recommended" is sent by the investment strategy evaluator 210.

Let the market entry direction strategy SE1 be SE1=[(1, 0, 1), (1,1,1), (1, 1, 0)]. If the market entry direction forecasting strategy PE2 also is [(1, 0, 1), (1,1,1), (1, 1, 0)], this indicates that market entry is recommended, and the method proceeds to the step S250. If the market entry direction forecasting strategy PE2 is [(1, 0, 1), (1,0,1)], this indicates that market entry is not recommended, and the method proceeds to the step S280.

In step S240, whether the holding direction forecasting strategy PF2 of the future forecasting trend S2 matches the holding direction strategy SF1 of the investment strategy rule S1 is determined by the investment strategy evaluator

210. If it is determined that the two strategies match, then the method proceeds to the step S260, a message "holding recommended" is sent by the investment strategy evaluator 210. If it is determined that the two strategies do not match, then the method proceeds to the step S270, a message "market exit recommended" is sent by the investment strategy evaluator 210.

Let the holding direction strategy SF1 be SF1=[(0, 1, 0), (0,0,1)]. If the holding direction forecasting strategy PF2 also is [(0, 1, 0), (0,0,1)], this indicates that the investor could continue to hold the investment target in the investment market, and the method proceeds to the step S260. If the holding direction forecasting strategy PF2 is [(1, 1, 1), (1,0,1)], this indicates that holding is not appropriate, and the method proceeds to the step S270.

In the above embodiment, the comparison result between the market entry direction forecasting strategy PE2 and the market entry direction strategy SE1 is used as a basis for determining whether to enter the market, and the comparison result between the holding direction forecasting strategy PF2 and the holding direction strategy SF1 is used as a basis for determining whether to hold the investment target. In another embodiment, the fluctuation in the trend of the investment market could also be taken into the consideration of determining whether to enter the market and whether to hold the investment target. Using the fluctuation in the trend of the investment market as a basis for determining whether to enter the market and whether to hold the investment target is suitable for the stock market.

In step S110, an investment strategy model M1 is generated by the investment strategy rule generator 110 according to the history trend of the investment market over a front segment of the time period ΔT, then the accuracy of the investment strategy model M1 is tested according to the history trend of the investment market over a rear segment of the time period ΔT, wherein the accuracy further includes a market fluctuation forecasting accuracy A2 in addition to the market direction forecasting accuracy A1 disclosed above, and the market direction forecasting accuracy A1 and the market fluctuation forecasting accuracy A2 both are lower than 100%.

In step S120, each candidate investment rule R, further includes a candidate market entry fluctuation rule G and a candidate holding fluctuation rule H in addition to the candidate market entry direction rule E and the candidate holding direction rule F disclosed above.

The candidate market entry fluctuation rule G could be represented as (Gx). Parameter Gx indicates that the fluctuation in the trend over a future time period is "swell", "diminish" or "negligible", and "a future time period" could be the next month, but the embodiment of the present disclosure is not limited thereto. For example, if the fluctuation over the next month is "swell", the candidate market entry fluctuation rule G is represented as: (swell). Based on the above principles, the candidate market entry fluctuation rule G has three combinations. Here, "fluctuation" refers to the fluctuation span in the trend of the investment market over a future time period with respect to the current time point (that is, the current month). If the fluctuation span is larger than a first default proportion, then fluctuation is defined as "swell"; if the fluctuation span is smaller than a second default proportion, fluctuation is defined as "diminish" and the fluctuation span is between the two default proportions, then fluctuation is defined as "negligible". The first default proportion could be set to be 20%, or could be set to be higher than or lower than 20%. The second default proportion could be set to be 20%, or could be set to be higher than or lower than 20%. The first default proportion could be equivalent to or different from the second default proportion.

Similarly, the candidate holding fluctuation rule H could be represented as (Hx). Parameter Hx indicates that the fluctuation in the trend over a future time period is "swell", "diminish" or "negligible", and "a future time period" could be the next month, but the embodiment of the present disclosure is not limited thereto. For example, if the fluctuation over the next month is "swell", then the candidate holding fluctuation rule H is represented as: (swell). Based on the above principles, the candidate holding fluctuation rule H has three combinations.

After all combinations of the candidate market entry direction rule E, all combinations of the candidate holding direction rule F, all combinations of the candidate market entry fluctuation rule G, and all combinations of the candidate holding fluctuation rule H are determined, the combinations of the candidate investment rule R could then be determined. In the present embodiment, the candidate investment rule R is a combination of all candidate market entry direction rules E, all candidate holding direction rules F, all candidate market entry fluctuation rules G and all candidate holding fluctuation rules H. For example, the candidate investment rule R has $(2^3-1) \times (2^3-1) \times 3 \times 3$ combinations, that is, in the present embodiment, the value of N is $(2^3-1) \times (2^3-1) \times 3 \times 3$.

Then, in step S120B of FIG. 3, a market entry fluctuation forecasting rule PG1 is generated by the investment strategy rule calculator 120 according to the market fluctuation forecasting accuracy A2. The representation of the market entry fluctuation forecasting rule PG1 is similar to that of the candidate market entry fluctuation rule G, and the similarities are not repeated here. In step S120C of FIG. 3, a holding fluctuation forecasting rule PH1 is generated by the investment strategy rule calculator 120 according to the market fluctuation forecasting accuracy A2. The representation of the holding fluctuation forecasting rule PH1 is similar to that of the candidate holding fluctuation rule H, and the similarities are not repeated here.

Following step S120D of FIG. 3, the investment strategy rule calculator 120 takes the candidate market entry fluctuation rule G into the consideration of determining whether to enter the market and takes the candidate holding fluctuation rule H into the consideration of determining whether to hold the investment target. For example, in step S120E, whether the market entry direction forecasting rule PE1 and the market entry fluctuation forecasting rule PG1 match the candidate market entry direction rule E and the candidate market entry fluctuation rule G of the candidate investment rule $R_i$ is determined by the investment strategy rule calculator 120, the following operation is similar to that disclosed in the above embodiment, and the similarities are not repeated here. For example, in step S120F, whether the holding direction forecasting rule PF1 and the holding fluctuation forecasting rule PH1 match the candidate holding direction rule F and the candidate holding fluctuation rule H of the candidate investment rule $R_i$ is determined by the investment strategy rule calculator 120, the following operation is similar to that disclosed in the above embodiment, and the similarities are not repeated here.

The investment strategy rule S1 could be obtained according to the above rule. In the present embodiment, the investment strategy rule S1 further includes a market entry fluctuation strategy SG1 and a holding fluctuation strategy SH1 in addition to the market entry direction strategy SE1 and the holding direction strategy SF1, wherein the representations of the market entry fluctuation strategy SG1 and holding fluctuation strategy SH1 are similar to that of the market entry fluctuation forecasting rule PG1 and the holding fluctuation forecasting rule PH1, and the similarities are not repeated here.

Similarly, after the investment strategy rule S1 is obtained, the investment strategy rule S1 could be used as the investor's reference in the real investment market. For example, in step S210, the future forecasting trend S2 is forecasted by the investment strategy rule generator 110 using the investment strategy model M1. In the present embodiment, the future forecasting trend S2 further includes a market entry fluctuation forecasting strategy PG2 and a holding fluctuation forecasting strategy PH2 in addition to the market entry direction forecasting strategy PE2 and the holding direction forecasting strategy PF2, wherein the representations of the market entry fluctuation forecasting strategy PG2 and the holding fluctuation forecasting strategy PH2 are similar to that of the candidate market entry fluctuation rule G and the candidate holding fluctuation rule H.

Then, in step S230, whether the market entry direction forecasting strategy PE2 and the market entry fluctuation forecasting strategy PG2 of the future forecasting trend S2 respective match the market entry direction strategy SE1 and the market entry fluctuation strategy SG1 of the investment strategy rule S1 is determined by the investment strategy evaluator 210, the following operation is similar to that disclosed in the above embodiment, and the similarities are not repeated here. In step S240, whether the holding direction forecasting strategy PF2 and the holding fluctuation forecasting strategy PH2 of the future forecasting trend S2 respectively match the holding direction strategy SF1 and holding fluctuation strategy SH1 of the investment strategy rule S1 is determined by the investment strategy evaluator 210, the following operation is similar to that disclosed in the above embodiment, and the similarities are not repeated here.

To summarize, the investment strategy model generated in the investment strategy rule generation method disclosed in the above embodiments of the present disclosure has an inadequacy, that is, the market direction forecasting accuracy is lower than 100%. However, this inadequacy could be compensated by obtaining a total investment return of each of N candidate investment rules and further using the candidate investment rule corresponding to the best of the total investment returns as an investment strategy rule of the investment strategy model.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. An investment strategy rule generation method, comprising:
generating an investment strategy model by an investment strategy rule generator circuit according to a history trend of an investment market, wherein the investment strategy model has a market direction forecasting accuracy lower than 100%;
obtaining a total investment return of each of N candidate investment rules by an investment strategy rule calculator circuit, wherein each of the N candidate investment rules comprises a candidate market direction rule, N is a positive integer equivalent to or larger than 2, and the obtaining step comprises:
performing an investment simulation at each of a plurality of time points in each of a plurality of time windows of a time period, wherein adjacent two time windows are separated by a time interval, a length of each time interval is less than a length of each time window, and the investment simulation comprises:
generating a market direction forecasting rule according to the market direction forecasting accuracy; and
performing a market entry investment model or a holding investment model according to the market direction forecasting rule and the candidate market direction rule of the i-th of the N candidate investment rules, wherein i is a positive integer between 1 to N;
calculating a short-term investment return under an operation of the market entry investment models and the holding investment models over each time window of the time period by the investment strategy rule calculator circuit; and
calculating the short-term investment returns to obtain an average value and use the average value as the total investment return; and
using the candidate investment rule corresponding to the best of the total investment returns as an investment strategy rule of the investment strategy model by the investment strategy rule calculator circuit.

2. An investment strategy rule generation method, comprising:
generating an investment strategy model by an investment strategy rule generator circuit according to a history trend of an investment market, wherein the investment strategy model has a market direction forecasting accuracy lower than 100%;
obtaining a total investment return of each of N candidate investment rules by an investment strategy rule calculator circuit, wherein N is a positive integer equivalent to or larger than 2, each of the N candidate investment rules comprises a candidate market entry direction rule and a candidate holding direction rule, and the obtaining step comprises:
performing an investment simulation at each of a plurality of time points in a time window of a time interval, wherein the investment simulation comprises:
generating a market entry direction forecasting rule according to the market direction forecasting accuracy;
generating a holding direction forecasting rule according to the market direction forecasting accuracy;
determining whether a current investment model is in a holding state;
determining whether the market entry direction forecasting rule matches the candidate market entry direction rule of the i-th of the N candidate investment rules if it is determined that the current investment model is not in the holding state, wherein i is a positive integer between 1 to N;
performing a market entry investment model if it is determined that the market entry direction forecasting rule matches the candidate market entry direction rule of the i-th of the N candidate investment rules;
determining whether the holding direction forecasting rule matches the candidate holding direction rule of the i-th of the N candidate investment rules if it is determined that the current investment model is in the holding state; and performing a holding investment model if it is determined that the holding direction forecasting rule matches the candidate holding direction rule of the i-th of the N candidate investment rules;
calculating a short-term investment return by the investment strategy rule calculator circuit under an operation of the market entry investment models and the holding investment models over each time window of the time period; and
calculating the short-term investment returns to obtain an average value and use the average value as the total investment return; and
using the candidate investment rule corresponding to the best of the total investment returns as an investment strategy rule of the investment strategy model by the investment strategy rule calculator circuit.

3. The investment strategy rule generation method according to claim 2, wherein the step of performing the investment simulation further comprises:
performing the investment simulation if it is determined that the market entry direction forecasting rule does not match the candidate market entry direction rule of the i-th of the N candidate investment rules at the next of the time points in the time window of the time interval.

4. The investment strategy rule generation method according to claim 2, wherein the step of performing the investment simulation further comprises:
performing a market exit investment model if it is determined that the holding direction forecasting rule does not match the candidate holding direction rule of the i-th of the N candidate investment rules.

5. The investment strategy rule generation method according to claim 2, wherein the step of generating the investment strategy model by the investment strategy rule generator circuit is completed using a deep neural network (DNN) or a support vector machine (SVM) technology.

6. The investment strategy rule generation method according to claim 2, wherein in the step of generating the investment strategy model by the investment strategy rule generator circuit, the investment strategy model further has a market fluctuation forecasting accuracy lower than 100%;
the step of performing the investment simulation further comprises:
generating a market entry fluctuation forecasting rule according to the market fluctuation forecasting accuracy;
generating a holding fluctuation forecasting rule according to the market fluctuation forecasting accuracy;
the step of determining whether the market entry direction forecasting rule matches the candidate market entry direction rule of the i-th of the N candidate investment rules if it is determined that the current investment model is not in the holding state further comprises: determining whether the market entry fluctuation forecasting rule matches a candidate market entry fluctuation rule of the i-th of the N candidate investment rules;
the step of performing the market entry investment model further comprises: performing the market entry investment model if it is determined that the market entry direction forecasting rule and the market entry fluctuation forecasting rule matches the candidate market entry direction rule of the i-th of the N candidate investment rules and the candidate market entry fluctuation rule;
the step of determining whether the holding direction forecasting rule matches the candidate holding direction rule of the i-th of the N candidate investment rules if it is determined that the current investment model is in the holding state further comprises: determining whether the holding fluctuation forecasting rule matches the candidate holding fluctuation rule of the i-th of the N candidate investment rules;
the step of performing the holding investment model further comprises: performing the holding investment model if it is determined that the holding direction forecasting rule and the holding fluctuation forecasting rule match the candidate holding direction rule of the i-th of the N candidate investment rules and the candidate holding fluctuation rule.

7. An investment strategy rule device, comprising:
an investment strategy rule generator circuit configured to:
generate an investment strategy model according to a history trend of an investment market, wherein the investment strategy model has a market direction forecasting accuracy lower than 100%; and
an investment strategy rule calculator circuit configured to:
obtain a total investment return of each of N candidate investment rules, wherein N is a positive integer equivalent to or larger than 2, each of the N candidate investment rules comprises a candidate market entry direction rule and a candidate holding direction rule, and the obtaining step comprises:
performing an investment simulation at each of a plurality of time points in each of a plurality of time windows of a time period, wherein adjacent two time windows are separated by a time interval, a length of each time interval is less than a length of each time window, and the investment simulation comprises:
generating a market entry direction forecasting rule according to the market direction forecasting accuracy;
generating a holding direction forecasting rule according to the market direction forecasting accuracy; and
determining whether a current investment model is in a holding state;
determining whether the market entry direction forecasting rule matches the candidate market entry direction rule of the i-th of the N candidate investment rules if it is determined that the current investment model is not in the holding state, wherein i is a positive integer between 1 to N;
performing a market entry investment model if it is determined that the market entry direction forecasting rule matches the candidate market entry direction rule of the i-th of the N candidate investment rules;
determining whether the holding direction forecasting rule matches the candidate holding direction rule of the i-th of the N candidate investment rules if it is determined that the current investment model is in the holding state; and
performing a holding investment model if it is determined that the holding direction forecasting rule matches the candidate holding direction rule of the i-th of the N candidate investment rules;

calculate a short-term investment return under an operation of the market entry investment models and the holding investment models over each time window of the time period; and calculating the short-term investment returns to obtain an average value and use the average value as the total investment return;

use the candidate investment rule corresponding to the best of the total investment returns as an investment strategy rule of the investment strategy model.

8. The investment strategy rule device according to claim 7, wherein in the step of performing the investment simulation, the investment strategy rule calculator circuit is further configured to:

perform the investment simulation at the next of the time points in the time window of the time interval if it is determined that the market entry direction forecasting rule does not match the candidate market entry direction rule of the i-th of the N candidate investment rules.

9. The investment strategy rule device according to claim 7, wherein in the step of performing the investment simulation, the investment strategy rule calculator circuit is further configured to:

perform a market exit investment model if it is determined that the holding direction forecasting rule does not match the candidate holding direction rule of the i-th of the N candidate investment rules.

10. The investment strategy rule device according to claim 7, wherein the step of generating the investment strategy model by the investment strategy rule generator circuit is completed using a deep neural network or a support vector machine technology.

11. The investment strategy rule device according to claim 7, wherein in the step of generating the investment strategy model by the investment strategy rule generator circuit, the investment strategy model further has a market fluctuation forecasting accuracy lower than 100%;

the step of performing the investment simulation further comprises:

generating a market entry fluctuation forecasting rule according to the market fluctuation forecasting accuracy; and generating a holding fluctuation forecasting rule according to the market fluctuation forecasting accuracy;

the step of determining whether the market entry direction forecasting rule matches the candidate market entry direction rule of the i-th of the N candidate investment rules if it is determined that the current investment model is not in the holding state further comprises: determining whether the market entry fluctuation forecasting rule matches a candidate market entry fluctuation rule of the i-th of the N candidate investment rules;

the step of performing the market entry investment model further comprises: performing the market entry investment model if it is determined that the market entry direction forecasting rule and the market entry fluctuation forecasting rule matches the candidate market entry direction rule of the i-th of the N candidate investment rules and the candidate market entry fluctuation rule;

the step of determining whether the holding direction forecasting rule matches the candidate holding direction rule of the i-th of the N candidate investment rules if it is determined that the current investment model is in the holding state further comprises: determining whether the holding fluctuation forecasting rule matches the candidate holding fluctuation rule of the i-th of the N candidate investment rules;

the step of performing the holding investment model further comprises: performing the holding investment model if it is determined that the holding direction forecasting rule and the holding fluctuation forecasting rule matches the candidate holding direction rule of the i-th of the N candidate investment rules and the candidate holding fluctuation rule.

* * * * *